Feb. 5, 1929.
D. F. YOUNGBLOOD
1,701,349
SPEAKING DEVICE
Filed July 31, 1928
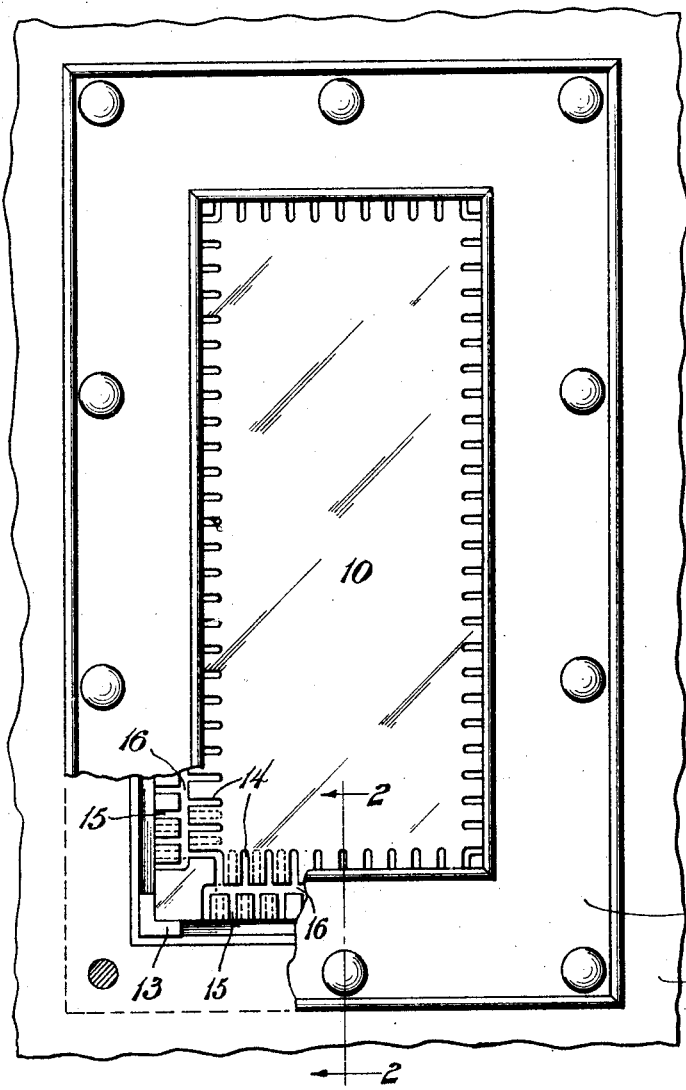
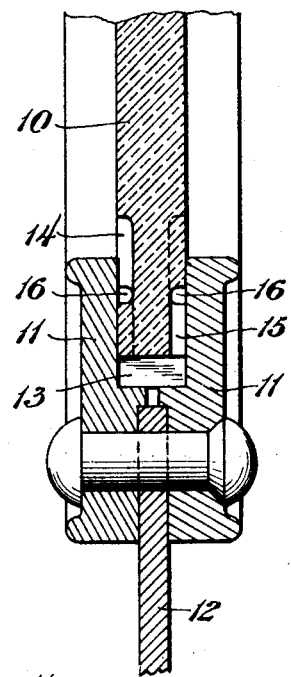
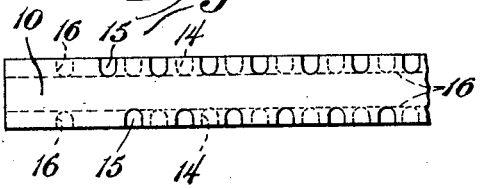
INVENTOR
D. F. Youngblood,
BY
Siggers & Adams,
ATTORNEYS Patented Feb. 5, 1929.

1,701,349

UNITED STATES PATENT OFFICE.

DAVID FRANKLIN YOUNGBLOOD, OF SAN ANTONIO, TEXAS.

SPEAKING DEVICE.

Application filed July 31, 1928. Serial No. 296,593.

This invention relates to speaking devices such as are adapted for use in jails, asylums and the like where visitors converse with prisoners, inmates and aims to provide an improved window installation in which the window pane or glass has provision for transmitting sound through the window frame, the arrangement being such as to prevent the passage of contraband articles from one side to the other.

In the accompanying drawing, wherein one illustrative embodiment of the invention is shown, Fig. 1 is a front elevation, partly broken away, of a window installation applied to a metal wall or partition;

Fig. 2 is a fragmentary sectional view taken on the line 2—2 of Fig. 1; and

Fig. 3 is a fragmentary edge view of the pane of glass shown in Fig. 1.

In modern jails, asylums, and the like some provision is usually made for communication between visitors and inmates, but it has been found necessary to prevent the passage of articles from one to the other. The present invention aims to provide a simple installation wherein a glass window pane is constructed and arranged to answer the foregoing requirements without necessitating any modification of the window frame.

Referring to Figs. 1 and 2, there is shown an improved glass pane 10 mounted in a glass channel in two similar frame members 11, which are preferably riveted on opposite sides of a tool-proof or metal partition 12 of a cell or the like, the frame construction being conveniently like those ordinarily employed for the purpose.

To provide for the passage of sound from one side of the window to the other, the window pane 10 is shown as being slightly spaced from the bottoms of the channels by means of a series of L-shaped feet 13 conveniently arranged at the four corners of the channels and a series of shallow grooves are formed on opposite sides of the glass so that they communicate with each other through the space between the edges of the glass and the bottoms of the channels. Herein, there are shown two rows of grooves 14 and 15 adjacent to the marginal edges of the glass and arranged in staggered relation, communicating with each other through a single groove 16 which is preferably parallel with the edges of the glass, the idea being to prevent the passage of an article through a groove 14, a groove 15, the channel and up through a groove 15 and groove 14 to the opposite side of the window. As shown in Fig. 1, the grooves 16 are preferably parallel with the marginal edges of the glass and are concealed behind the inner edges of the frame members 11.

For some installations, only a few of sound conducting grooves may be necessary, but in view of the fact that they can easily be formed on a pane of glass, and also that some of them are likely to become clogged with foreign matter, it is desirable to provide such grooves all around the periphery of the glass on each side. Also, it is obvious that only one set of staggered grooves may be used on one side of the glass while the other side may have a single row of grooves. Referring to Fig. 3, it will be noted that the grooves which pass through the marginal edges of the glass are also arranged in staggered relation whereby to prevent or preclude possibility of starting an article which may have been pushed through one side of grooves on its way through and out the other side. It will be practically impossible to force a very small piece of wire like an ordinary hairpin through the installation.

From the foregoing description, it will be seen that such an installation may be made at a very small cost and that the window glass serves the double purpose of permitting communicants to see and to converse with each other.

Obviously, the present invention is not restricted to the particular embodiment thereof herein shown and described.

What is claimed is:—

1. A window installation for jails and the like comprising, in combination, a frame presenting a window receiving channel; and a glass pane secured in the channel presenting a sound transmitting groove whereby sound may pass through said channel.

2. A window installation for jails and the like comprising, in combination, a window frame; and a glass pane having a series of sound transmitting grooves at its edges in the opposed faces and so arranged that sound may pass around the edges of the pane and through the frame.

3. A window installation for jails and the like comprising, in combination, a window frame comprising complemental frame members secured on opposite sides of a metal wall and presenting a window receiving channel;

and a glass pane in said channel and supported with its marginal edges spaced from the bottom thereof, said pane presenting sound conducting openings on opposite sides adjacent to the marginal edges thereof so that sound is conducted through said passages and said channel from one side of the pane to the other side.

4. A window installation of the character described, comprising, in combination, a metal window frame having a glass receiving channel therein; a glass in said channel; spacer feet supporting the marginal edges of the glass from the bottom of the channel; said glass having shallow grooves on opposite sides adjacent to the marginal edges thereof, the grooves on one side being staggered with respect to those on the opposite side and arranged to conduct sound through the spaces between the marginal edges of the glass and the bottom of the channel from one side to the other of the glass.

5. A window installation of the character described comprising, in combination, a pair of metal frame members secured on opposite sides of a partition and presenting a window receiving channel; and a glass supported in said channel presenting staggered sets of communicating grooves on the opposite sides extending through the marginal edges thereof to conduct sound from one side of the window to the other and to prevent the passage of contraband articles therethrough.

6. A glass window pane of the character described having sound conducting grooves on its opposite faces extending through the marginal edges thereof.

In testimony, that I claim the foregoing as my own, I have hereto affixed my signature.

DAVID FRANKLIN YOUNGBLOOD.